(12) United States Patent
Chenu

(10) Patent No.: US 8,671,312 B2
(45) Date of Patent: Mar. 11, 2014

(54) SECURE CHECKING OF THE EXCLUSIVITY OF AN ACTIVE/PASSIVE STATE OF PROCESSING UNITS

(75) Inventor: Eric Chenu, Chaville (FR)

(73) Assignee: Siemens S.A.S., Cedex (FR)

( * ) Notice: Subject to any disclaimer, the term of this patent is extended or adjusted under 35 U.S.C. 154(b) by 221 days.

(21) Appl. No.: 13/255,990

(22) PCT Filed: Mar. 31, 2009

(86) PCT No.: PCT/EP2009/053778
§ 371 (c)(1),
(2), (4) Date: Sep. 16, 2011

(87) PCT Pub. No.: WO2010/102677
PCT Pub. Date: Sep. 16, 2010

(65) Prior Publication Data
US 2012/0005543 A1    Jan. 5, 2012

(30) Foreign Application Priority Data

Mar. 12, 2009    (EP) .................................... 09290180

(51) Int. Cl.
*G06F 11/00*    (2006.01)
(52) U.S. Cl.
USPC .................................. 714/13; 714/11; 714/12
(58) Field of Classification Search
USPC .......................................................... 714/13
See application file for complete search history.

(56) References Cited

U.S. PATENT DOCUMENTS

| 4,823,256 | A |  | 4/1989 | Bishop et al. |
| 4,980,819 | A | * | 12/1990 | Cushing et al. ................. 712/30 |
| 6,357,024 | B1 | * | 3/2002 | Dutton et al. .................. 714/45 |
| 6,571,363 | B1 | * | 5/2003 | Steiss ........................... 714/732 |
| 6,687,851 | B1 | * | 2/2004 | Somers et al. .................. 714/12 |
| 6,691,258 | B1 | * | 2/2004 | Herold et al. ................... 714/45 |
| 6,772,368 | B2 | * | 8/2004 | Dhong et al. ................... 714/11 |
| 6,820,213 | B1 | * | 11/2004 | Somers et al. .................. 714/11 |
| 7,721,149 | B2 | * | 5/2010 | Essame et al. .................. 714/11 |
| 7,904,775 | B2 | * | 3/2011 | Bancel et al. ................. 714/732 |
| 2005/0268163 | A1 | * | 12/2005 | Bancel et al. ................... 714/11 |
| 2007/0067674 | A1 | * | 3/2007 | Essame et al. .................. 714/14 |

* cited by examiner

*Primary Examiner* — Kamini Patel
(74) *Attorney, Agent, or Firm* — Laurence A. Greenberg; Werner H. Stemer; Ralph E. Locher

(57) ABSTRACT

In a method and a device for securely checking the exclusivity of a binary active/passive state of redundant units, the device includes: at least one exclusive communication device of the state capable of transmitting an exclusive signal relating to the exclusivity of the state to at least one checking device integrated within each of the units. The checking device is capable of checking and confirming the exclusivity of the state. Each of said redundant units in the active state is capable of transmitting to the exclusive communication device the identity signal; the exclusive communication device is capable of receiving at least one of the identity signals from the redundant units; the exclusive communication signal is capable of producing the exclusive signal from at least one of the identity signals; and the checking device is capable of determining the exclusivity of the state of the unit by reading the exclusive signal.

20 Claims, 2 Drawing Sheets

US 8,671,312 B2

Figure 1:
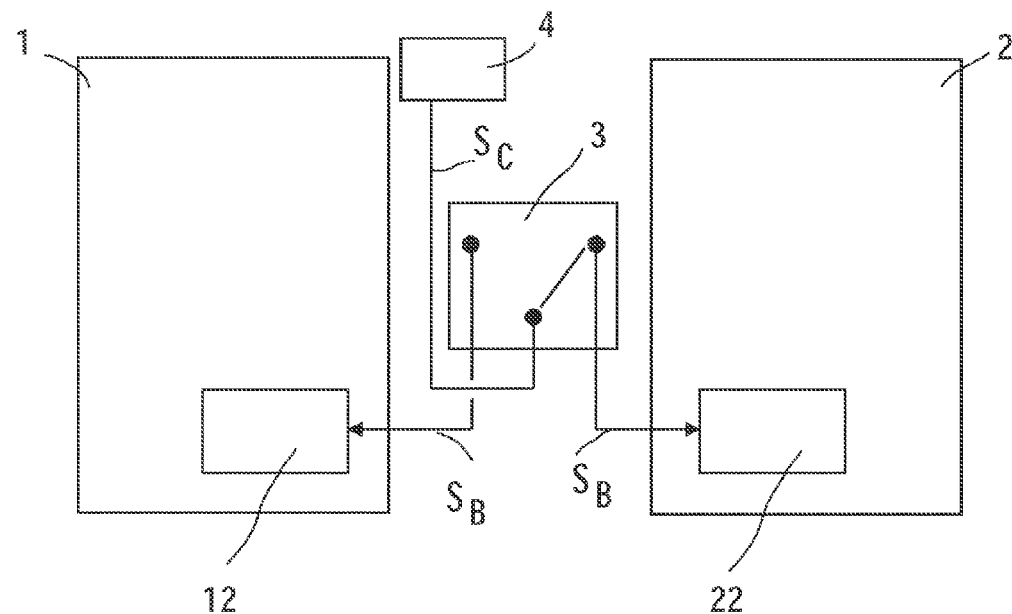

SECURE CHECKING OF THE EXCLUSIVITY OF AN ACTIVE/PASSIVE STATE OF PROCESSING UNITS

BACKGROUND OF THE INVENTION

Field of the Invention

The present invention relates to a device and a method for checking the exclusivity of a binary, active/passive state of redundant processing units An exclusive communication device transmits an exclusivity signal relating to the exclusivity of the state to at least one checking device integrated within each of the units, and the checking device checks and confirms the exclusivity of the state.

In particular, the invention relates to the architectures formed by intrinsically safe redundant units associated in particular with the safeguarding of guided vehicles and for which a guarantee that one and only one of said units is in an active state is a necessary condition for the correct and safe operation of said vehicles. In particular, the invention relates to securely checking the exclusivity of the active/passive state of said units.

A unit is described as redundant if there are, within a single architecture, at least two identical units, each able to perform the functions, or in other words, the work, of the other unit. Also, by exclusivity, reference is made to the fact that, among the redundant units forming said architecture, one and only one of said units is active, i.e. in the active state, at a given time, while, at the same moment, i.e. at the same time, all the other units are passive, i.e. in the passive state. For their part, the terms "guided vehicles" refer in particular to means of public transport such as buses, trolleybuses, trams, metros, trains or train units, etc., for which the safety aspect is very important. Such redundant architectures are for example used in automatic control computers for said guided vehicles.

The exclusivity of an active/passive state of redundant units can be securely checked by means of a checking device comprising:
- a secure input, i.e. a checking means capable of checking and confirming the exclusivity of said state, integrated within each of said units,
- an electromechanical security relay, i.e. a communication device connected to each of said secure inputs and capable of transmitting to at least one of said secure inputs an exclusive signal relating to the exclusivity of said state.

Unfortunately, said checking device has several major disadvantages:
- considerable size: the space required for its implementation results in a sizeable checking device, especially as part of a usage with several redundant units,
- high cost, especially as part of a usage with several redundant units,
- lack of reliability: the use of electromechanical elements reduces the reliability of the function of exclusivity of the active/passive state of the redundant units, especially owing to faults in a contact mechanism of said relay,
- great sensitivity to shocks and vibrations associated with the use of electromechanical elements,
- lack of diversity among suppliers.

BRIEF SUMMARY OF THE INVENTION

An object of the present invention is to propose a device and a method guaranteeing secure checking of the exclusivity of an active/passive state of redundant units with a high level of reliability, i.e. characterized by a level of security reaching at least $10^{11}$ checking failures per hour and by small size and low cost.

Another object of the invention consists in producing a device which is compact, functional, free of any electromechanical element, free of secure inputs and able to guarantee the exclusivity of the active/passive state of several redundant units, free of limitation with regard to the number of said redundant units.

According to these objects, a device and a method are as claimed. A set of sub-claims presents advantages of the invention.

On the basis of a method for securely checking the exclusivity of a binary, active/passive state of redundant units comprising:
- transmission by an exclusive communication device of an exclusivity signal relating to the exclusivity of said state to at least one checking means, said checking means being integrated within each of said redundant units
- checking and confirmation of the exclusivity of said state by said checking means, the method according to the invention is characterized by
- transmission by each active redundant unit of an identity signal to said exclusive communication device, said identity signal being specific to each unit which transmits it, in particular relating to the identity of said unit,
- reception by said exclusive communication device of at least one of said identity signals originating from said redundant units,
- production by said exclusive communication device of said exclusive signal from at least one of said identity signals,
- determination of said exclusivity based on a reading of said exclusivity signal by said checking means.

Advantageously, the method according to the invention is characterized in particular by a production of said specific identity signal by each of said redundant units. Thus, in a group of redundant units, each unit produces its own identity signal, which is always different from the identity signal produced by each of the other redundant units in the group.

In particular, the method according to the invention is characterized in that said production of said exclusive signal is performed free of electromechanical relays/switches. Advantageously, the operation of the exclusive communication device free of electromechanical relays/switches not only makes it possible to avoid all the technical faults and failures associated with the use of electromechanical parts, but also makes it possible not to be limited as regards the number of redundant units transmitting said identity signal to said exclusive communication device, while this number is limited to two in the case for example of an electromechanical relay. In fact, the method according to the invention is characterized by a guarantee of a single active unit among a group of units transmitting said identity signals to said exclusive communication device, said group possibly comprising a number of units greater than or equal to two.

Furthermore, the method according to the invention is advantageously characterized in that said exclusive signal is a function without alteration of one at most one of said identity signals. In fact, the exclusive communication device is capable of producing said exclusive signal as a function of at least one of said identity signals. Also, only the active units are capable of transmitting an identity signal. In other words, an inactive unit does not transmit said identity signal.

Thus, in a first case, if one and only one identity signal is transmitted to said exclusive communication device, then the exclusive signal will be produced from said identity signal without altering the latter. Consequently, the exclusive signal will be readable for the checking means integrated within the active unit, since it will be a function of said identity signal free of alteration. The checking means will then be capable of deducing the exclusivity of the active state of the unit to which it belongs.

In a second case, if several identity signals are transmitted at the same moment to said exclusive communication device, the exclusive signal produced from said identity signals will be a mixture or a combination of the latter, which will in particular be mutually scrambled, thus becoming unreadable for said checking means. In other words, the exclusive communication device will have altered said identity signals in order to produce said exclusive signal, since the exclusive communication device is only capable of transmitting free of alteration at most one single identity signal at a given instant. In other words, the exclusive communication device is capable of transmitting an identity signal free of alteration only when the latter is the sole signal received by the exclusive communication device at a given instant.

In fact, the method according to the invention is in particular characterized by mutual mixing and/or scrambling of an identity signal with at least one other identity signal originating from another unit whenever at least two units are active simultaneously, said mixing and/or scrambling being produced by said exclusive communication device. The exclusive signal thus transmitted to the different checking means will be unreadable by the latter, since the original identity signals, produced and transmitted by each of said active units, will have been altered by said scrambling and/or said mixing. The result is that the checking means of each of said active units will conclude that there is non-exclusivity of the active state of their respective units owing to the unreadability of said exclusive signal.

Finally, in a third case, and in particular if none of said redundant units is active, the signals, whether respectively identity signals or the exclusive signal, will not be transmitted respectively either to the exclusive communication device or to the checking means. Said checking means is then in particular capable of concluding that there is inactivity of all of said redundant units, in particular, of the unit to which it belongs, when said exclusive signal is not received. This situation will safely be considered to be non-exclusivity of the active state.

The method according to the invention is also characterized in that said determination of said exclusivity is based on a construction of a signature specific to said unit from a reading of said exclusive signal. Advantageously, the checking means is capable of constructing said signature from the exclusive signal. If one and only one of said redundant units is active at a given time, the signature constructed by the checking means will be recognized by said means, which will deduce the exclusivity of the active state of said unit. On the other hand, if the signature constructed is not recognized by said checking means, the latter will deduce the non-exclusivity of the active state of said unit, i.e. that more than one unit were or are active at the same moment.

In this context, the method according to the invention is characterized in that said productions and transmissions of said identity signals emitted by each of said units are performed by a signature device integrated within each of said units. In particular, an active unit produces and transmits said identity signal, which is specific to it. On the other hand, an inactive unit is produced, but does not transmit the identity signal specific to it or neither produces nor transmits the identity signal specific to it. In particular, the signature device is capable of producing an identity signal specific to the unit within which it is integrated and for which the specific nature of said identity signal is based on a sequence of binary data. Advantageously, said identity signals are produced cyclically with or without time synchronization with said checking means and said communication devices.

The method according to the invention is also characterized by a production of said exclusive signal based on a simple logical function. Non-restrictively, and not limitatively, the production of said exclusive signal may be based on optical, electro-optical or electrical elements.

On the basis of a device for securely checking exclusivity of a binary, active/passive state of redundant units, said device comprising:

at least one device for exclusive communication of said state capable of transmitting an exclusivity signal relating to the exclusivity of said state to at least one checking means integrated within each of said units, said checking means capable of checking and confirming the exclusivity of said state, the device according to the invention is characterized in that:

each of said redundant units in the active state is capable of transmitting an identity signal to said exclusive communication device, said identity signal being specific to and identified with the unit which transmits it, i.e. in particular said identity signal relates to the identity of the unit which transmits it, said exclusive communication device is capable of receiving at least one of said identity signals originating from said redundant units, said exclusive communication device is capable of producing said exclusivity signal from at least one of said identity signals received, said checking means is capable of determining the exclusivity of the state of said unit from a reading of said exclusivity signal.

In particular, the device according to the invention is characterized in that each of said redundant units is capable of producing said identity signal. In other words, in a group of redundant units, each unit produces its own identity signal, which is always different from the identity signal produced by one of the other redundant units in the group.

In particular, the device according to the invention is characterized in that said exclusive communication device is capable of producing said exclusive signal according to a method free of electromechanical switches. Advantageously, since said exclusive communication device is free of electromechanical switches, failures in checking the exclusivity associated with faults of mechanical origin are thus avoided, and also, the number of redundant units transmitting said identity signal is not limited to two, which would, on the other hand, be the case when using electromechanical switches in the exclusive communication device, in particular when using an electromechanical relay. The device according to the invention is capable of guaranteeing the active exclusivity of one and only one unit among a group of units transmitting said identity signals to said exclusive communication device, said group possibly comprising a number of units greater than or equal to two.

Furthermore, the device according to the invention is characterized in that said exclusive communication device is capable of transmitting free of alteration at most one of said identity signals originating from said redundant units at the time of production of said exclusive signal. In this way, the checking device is capable of guaranteeing that one identity signal at most is propagated without alteration, in particular via a predefined transfer function, in order to produce said exclusive signal, which will be transmitted to each of said checking means included in each of said units. In particular, said identity signal is not transmitted by the unit in the passive state, but only by the unit in the active state. For this purpose, the unit in the passive state may in particular produce said identity signal, but prevent its transmission, or simply not produce said identity signal.

When several identity signals representative of the active state of several units are transmitted at the same moment to said exclusive communication device, the exclusive signal produced by said exclusive communication device from said identity signals will be a mixture or a combination of the latter, which will in particular be affected by mutual scrambling and mixing. In other words, said exclusive communication device is capable of mixing and/or scrambling one identity signal with at least one other identity signal originating from another unit whenever at least two units are active simultaneously, since the exclusive communication device is only capable of transmitting free of alteration at most one single identity signal. The exclusive signal produced when several identity signals are received by the exclusive communication device at the same moment is a scrambled signal, unreadable for said checking means included in each of said units. On the basis of this characteristic of said exclusive signal, i.e. its unreadability, the checking means is capable of deducing the non-exclusivity of the active state of the unit to which it belongs.

In particular, said checking means is capable of constructing from said exclusive signal a signature making it possible to verify the exclusivity of the state of said unit. Said signature is specific to the unit to which the checking means belongs. Also, the signature constructed from an unreadable exclusive signal will not be recognized by said checking means, i.e. the checking means is incapable of reading an unreadable signature and, consequently, said checking means will conclude that there is non-exclusivity of the active state of the unit to which it belongs, while the signature constructed from a readable exclusive signal, i.e. which can be read, will be recognized by said checking means, which will be capable of deducing the exclusivity of the active state of the unit to which it belongs.

Also, the device according to the invention is characterized in that each of said units comprises a signature device capable of performing said productions and transmissions of said identity signal. In particular, an active unit produces and transmits said identity signal, which is specific to it. On the other hand, an inactive unit either produces, but does not transmit the identity signal specific to it, or neither produces nor transmits the identity signal specific to it. In particular, the signature device is capable of producing a sequence of binary data as a signal specific to said unit to which it belongs. Also, the signature device is capable of producing said identity signal cyclically, but also and in particular, continuously, intermittently or according to a combination of all or some of the cyclical, continuous and intermittent production characteristics. Finally, the signature device is capable of time synchronizing said signature production with said checking means and said communication devices.

Also, the device according to the invention is characterized in that said exclusive communication device is capable of producing said exclusive signal from a simple logical function. Neither restrictively nor limitatively, the exclusive communication device comprises optical, electro-optical or electrical elements.

Finally, an example relating to the prior art and a non-restrictive exemplary embodiment and application of the invention are provided using the following figures:

BRIEF DESCRIPTION OF THE SEVERAL
VIEWS OF THE DRAWING

FIG. 1 exemplary embodiment of a device for checking the active/passive exclusivity of redundant units based on a security relay the state of which is re-read by a security input according to the prior art.

Figure 2:
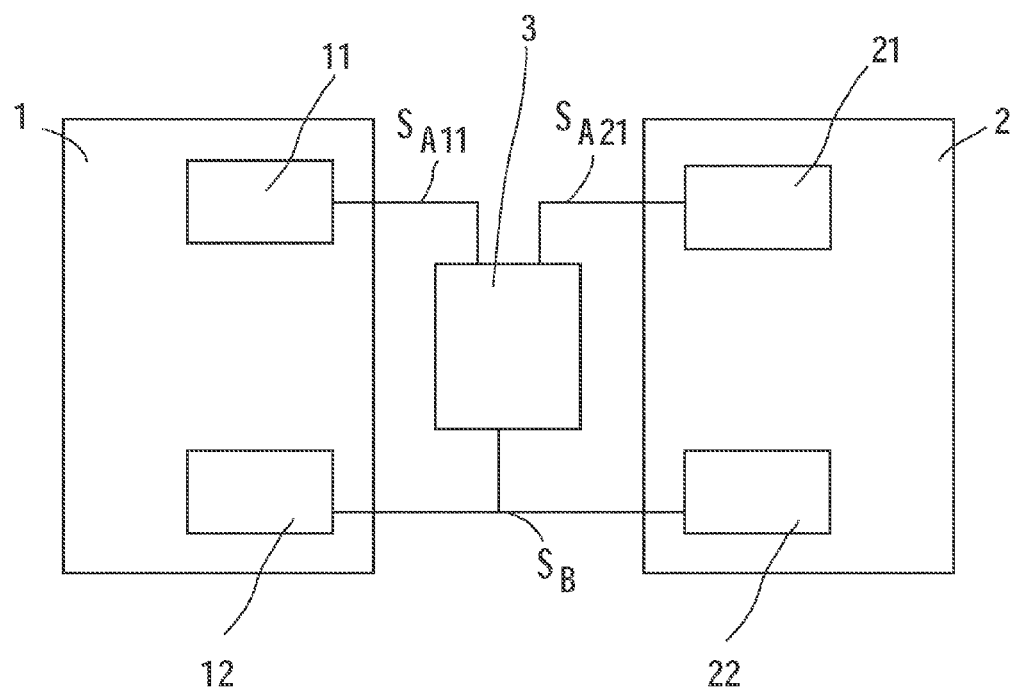

FIG. 2 exemplary embodiment according to the invention of a device for checking the active/passive exclusivity of redundant units free of any relay and any security input.

Figure 3:
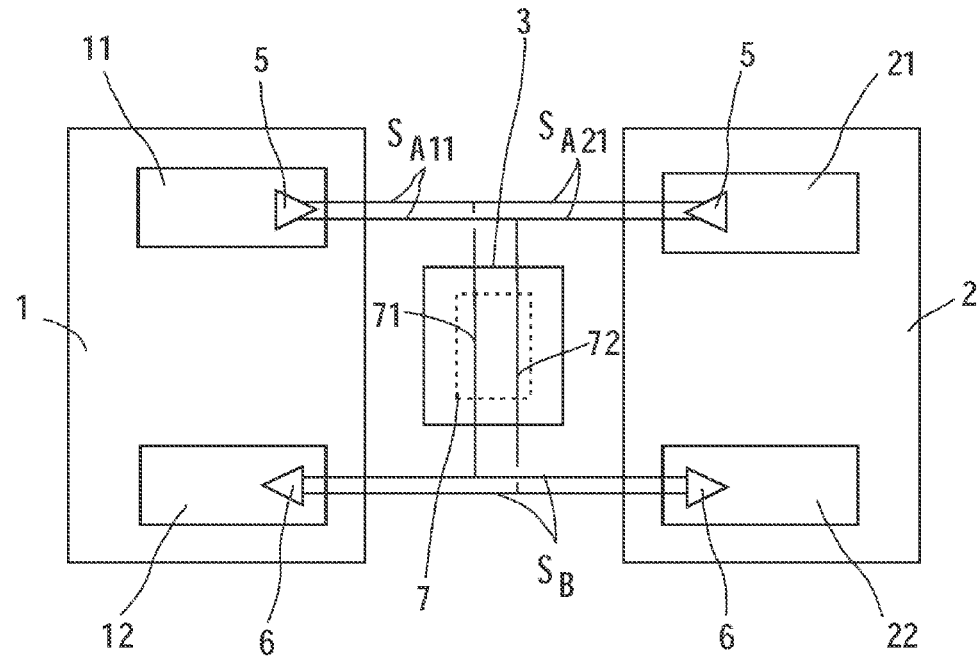

FIG. 3 exemplary embodiment according to the invention of a device for checking the active/passive exclusivity of redundant units wherein the exclusive communication device is based on a differential bus.

Figure 4:
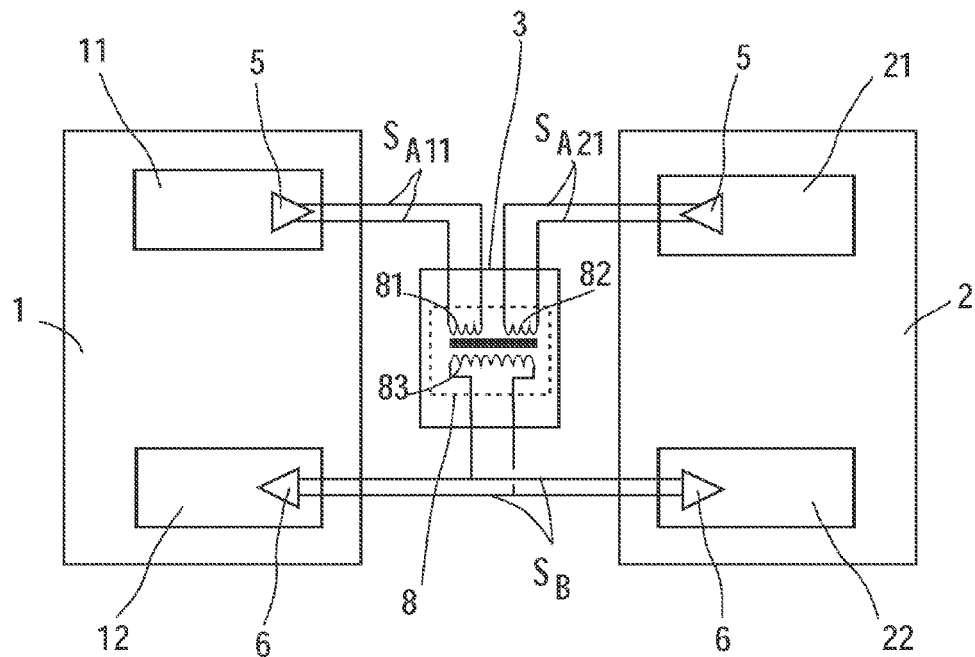

FIG. 4 exemplary embodiment according to the invention of a device for checking the active/passive exclusivity of redundant units wherein the exclusive communication device is based on a transformer.

DESCRIPTION OF THE INVENTION

As an example illustrating the prior art, FIG. 1 shows a device for securely checking the exclusivity of an active/passive state of redundant units (1, 2) comprising:
  an electromechanical security relay (3), i.e. a communication device capable of transmitting to at least one security input (12, 22) integrated within each of said units (1, 2) an exclusive signal ($S_B$) relating to the exclusivity of said state, in particular said relay (3) supplies energy, transmitted by a voltage supply (4) via an electrical signal ($S_C$), to one and only one of said security inputs (12, 22),
  said security inputs (12, 22) securely guarantee the active/passive exclusivity, given that each of them is a checking means capable of checking and confirming the exclusivity of said state.

FIG. 2 illustrates a device for securely checking the exclusivity of a binary, active/passive state of redundant units (1, 2), said device comprising:
  at least one device for the exclusive communication (3) of said state capable of transmitting an exclusive signal ($S_B$) relating to the exclusivity of said state to at least one checking means (12, 22) integrated within each of said units (1, 2),
  said checking means (12, 22) capable of checking and confirming the exclusivity of said state,
characterized in that
  each of said redundant units (1, 2) in the active state is capable of transmitting to said exclusive communication device (3) an identity signal ($S_{A11}$, $S_{A21}$), said identity signal being specific to and identified with the unit which transmits it, carrying for example a mark of its identity,
  said exclusive communication device (3) is capable of receiving at least one of said identity signals ($S_{A11}$, $S_{A21}$) originating from said redundant units (1, 2),
  said exclusive communication device (3) is capable of producing said exclusive signal ($S_B$) from at least one of said identity signals ($S_{A11}$, $S_{A21}$),
  said checking means (12, 22) are capable of determining the exclusivity of the state of said unit from a reading of said exclusive signal ($S_B$).

In particular, each of said redundant units (1, 2) is capable of producing said identity signal ($S_{A11}$, $S_{A21}$) specific to and identified with the unit which produces it, i.e. each unit produces an identity signal specific to it and different from another identity signal produced by other units. Also, and in particular, each of said units (1, 2) comprises a signature device (11, 21) capable of performing said productions and transmissions of said identity signal ($S_{A11}$, $S_{A21}$). Advantageously, said signature devices are capable of producing an identity signal ($S_{A11}$, $S_{A21}$) comprising a sequence of data, for example, a binary sequence, which can be used by the checking means cyclically to produce a signature by an appropriate calculation, for example, by a polynomial division, said signature making it possible to determine said exclusivity of the active/passive state of the unit to which it belongs.

More precisely, each of said units produces its own binary sequence at a different or equal rhythm, synchronized or not synchronized in time, continuously or intermittently. Advantageously, at least one differential driver can be integrated within the signature device (11, 21) so that, when the unit is inactive, the differential driver is in a state of high impedance, preventing the transmission of the identity signal ($S_{A11}$, $S_{A21}$) to the exclusive communication device (3). Conversely, when the unit is active, the driver is in a state of low impedance, allowing the transmission of the identity signal ($S_{A11}$, $S_{A21}$) to the exclusive communication device (3).

The exclusive communication device (3) is implemented so that the exclusive signal ($S_B$) is readable for said checking means (12, 22) if and only if the unit within which the checking means (12, 22) is integrated is the only active unit. Among a group of redundant units, if more than one unit is active at the same moment, the exclusive communication device (3) will produce a signal which is unreadable for said checking means included in each of said redundant units, said unreadability of the signal then being a characteristic of the non-exclusivity of the active state of each of said units. In particular, the unreadability will be determined as a function of the calculation of said signature produced by said checking means. The calculation of said signature allows the checking means to determine the exclusivity of the active/passive state of the unit to which it belongs. In particular, the checking means (12, 22) advantageously comprise optocoupler devices capable of reading and transmitting the exclusive signal.

Non-limitatively, different embodiments of the exclusive communication device (3) are possible:

In a first embodiment, said exclusive communication device (3) comprises a single link making it possible to transport the identity signals received from different redundant units, said link being for example an electrical lead or an optical, magnetic or radio-frequency link. More precisely, the identity signals originating from different units arrive at the exclusive communication device (3) along independent or dependent paths. Once received by the exclusive communication device, these identity signals are transported by means of said single link, so that said link is compulsory for said identity signals transmitted by the signature devices of said redundant units. Advantageously, it is thus not possible to create a breakage of the independent paths from the signature devices of each of said units to their respective checking means.

Furthermore, according to this first embodiment, said identity signals, in particular said sequences, are mutually mixed and/or scrambled at the level of said single link if more than one unit is in an active state at the same moment, so that the result is an exclusive signal which is unreadable for said checking means (12, 22). On the other hand, if one and only one unit is active at a given moment, the exclusive signal produced by the exclusive communication device will be readable for said active unit and unreadable for the inactive units. Thus, according to this first embodiment, said exclusive signal is produced by said exclusive communication device from the transfer at the same instant of one or more identity signals across said single link.

In a second embodiment, a simple logical function, for example an exclusive "OR", also known as "Xor", provides for the production of an exclusive signal which is only readable in the event of exclusivity of the active state of a unit at a given moment. For this purpose, the passive unit must be capable of disabling or stopping the production and/or transmission of the identity signal when it is not active or when another unit is active. For this purpose, one or more differential drivers may advantageously be used. Non-exhaustively, the logical function may be produced from a transformer, optocoupler devices or a logic gate but also from cabled, magnetic, optical or radio-frequency devices.

A third embodiment of the exclusive communication device is based on a data bus making it possible to transmit a sequence of data, which will be processed by the checking means on the basis of an algorithm suitable for producing a signature. This may involve for example a differential bus made up or not of twisted wires or a parallel bus such as, for example, a PCI bus or a VME bus. In actual fact, FIG. 3 presents a device for securely checking an active/passive state of redundant units (1, 2) using said data bus. In this third embodiment, each signature device (11, 21) of each of the two units (1, 2) comprises an isolated differential driver (5), through which the identity signal ($S_{A11}$, $S_{A21}$) is emitted, for example a binary sequence. The exclusive communication device (3) comprises a differential data bus (7) made up of two wires (71, 72), said differential data bus (7) receiving said identity signals ($S_{A11}$, $S_{A21}$) and transmitting, from the latter, said exclusive signal ($S_B$) to optocouplers (6) contained in said checking means (12, 22). In standard mode, only the active unit emits said identity signal on said differential data bus (7), the other unit putting its differential driver into a state of high impedance. If the two units are active at the same time, the differential drivers (5) of each of said units (1, 2) come into conflict, so that the differential data bus (7) will transmit an exclusive signal ($S_B$) which is unreadable for said checking means (12, 22). Precautionary cabling makes it possible to guarantee exclusivity: each of the two wires (71, 72) of the differential data bus (7) must be compulsory for each of the two identity signals ($S_{A11}$, $S_{A21}$) transmitted by the signature devices (11, 21) of each of the two units (1, 2), so that it is not possible to create two independent paths by breakage, i.e. a first path for the first unit (1) running from the signature device (11) to the checking means (12) and a second path for the second unit (2) running from the signature device (21) to the checking means (22).

Finally, a fourth embodiment of said exclusive communication device (3) is presented by FIG. 4. In this last embodiment, the identity signals ($S_{A11}$, $S_{A21}$) originating from the signature devices (11, 21) of respectively two redundant units (1, 2) are transmitted through differential drivers (5) to the exclusive communication device (3) comprising a three-coil transformer (8): two primary coils (81, 82) associated with said identity signals ($S_{A11}$, $S_{A21}$) and a secondary coil (83) associated with said exclusive signal ($S_B$). Said two units (1, 2) can respectively emit an identity signal, formed for example from a binary sequence, each on a respective primary coil (81, 82). In standard mode, only the active unit emits said identity signal on one of said primary coils (81, 82), so that the identity signal is transmitted to the secondary coil (83) without alteration. The inactive unit, for its part, is capable of putting its differential driver into a state of high impedance. Consequently, the secondary coil (83) will direct an exclusive signal ($S_B$) which is readable because unaltered to an optocoupler (6) contained in the checking device (12, 22) of the active unit. If the two units (1, 2) are active at the same moment, the identity signals ($S_{A11}$, $S_{A21}$) originating from each of the active units will be mixed at the level of the transformer (8), so that the exclusive communication device will produce an exclusive signal ($S_B$) which is unreadable transmitted to said checking devices (12, 22) of each of said active units (1, 2) through their respective optocouplers (6). Alternatively, it is also possible to use a transformer (8) with two secondary coils (81, 82) cabled in series. Advantageously, the device according to the invention using this fourth embodiment for its exclusive communication device (3) is capable of operating independently of the disconnection of one of said units (1, 2).

Possibly, filters may be added to the exclusive communication device (3) in order to limit the passband to the requirements of one and only one of said identity signals at the same time, so that said filters guarantee the exclusivity of the active/passive state of a unit. In fact, the width of the passband allows at most one single identity signal to pass at the same time and, therefore, if several identity signals attempt to pass at the same time, the exclusive signal produced by said exclusive communication device will be unreadable for said checking means. This characteristic of unreadability of the exclusive signal will allow the checking means to confirm the non-exclusivity of the active state of the unit to which they respectively belong and, therefore, it will be able to be deduced that several redundant units are active at the same moment.

A use of said device and of said method according to the invention is applicable to any type of equipment operating redundantly, in particular to automatic control computers for guided vehicles or also to distributed input/output modules.

To sum up, the method and the device according to the invention present several advantages with respect to the existing methods and devices in that:
- they provide a high level of security,
- they provide for a small size, in particular thanks to the use of electrical components, making for a compact device,
- they make it possible to check the exclusivity of the active state of a unit among a number of redundant units greater than or equal to two, each of said units transmitting its respective identity signal to the same exclusive communication device,
- they guarantee low cost of implementation of said checking device,
- they make it possible to produce a signature specific to each unit, guaranteeing the accuracy of the checking of the exclusivity of the active/passive state.

The invention claimed is:

1. A method for securely checking an exclusivity of a binary, active/passive state of redundant units, the method which comprises:
   transmitting from each active redundant unit an identity signal to an exclusive communication device, said identity signal being specific to each respective unit transmitting the identity signal;
   receiving with the exclusive communication device at least one of the identity signals originating from the redundant units;
   producing with the exclusive communication device an exclusivity signal from at least one of the identity signals;
   transmitting an exclusivity signal relating to the exclusivity of the state from the exclusive communication device to at least one checking device integrated within each of the units; and
   checking and determining the exclusivity based on a reading of the exclusivity signal by the checking device and confirming the exclusivity of the state with the checking device.

2. The checking method according to claim 1, which comprises producing the identity signal with each of the redundant units.

3. The checking method according to claim 1, which comprises producing the exclusivity signal without electromechanical switches.

4. The checking method according to claim 1, wherein the exclusivity signal is a function without alteration of at most one of the identity signals.

5. The checking method according to claim 1, which comprises determining the exclusivity based on a construction of a signature specific to the unit from the reading of the exclusivity signal.

6. The checking method according to claim 1, which comprises producing and transmitting the identity signals emitted by each of the units with a signature device integrated within each of the units.

7. The checking method according to claim 1, wherein a dedicated feature of the identity signal is based on a sequence of binary data.

8. The checking method according to claim 1, which comprises producing the identity signals cyclically.

9. The checking method according to claim 1, which comprises mutually mixing and scrambling one identity signal with at least one other identity signal originating from another unit whenever at least two units are active simultaneously, the mixing and scrambling being performed by the exclusive communication device.

10. The checking method according to claim 1, which comprises producing the exclusivity signal based on a simple logical function.

11. A device for securely checking an exclusivity of a binary, active/passive state of redundant units, the device comprising:
   at least one device for exclusive communication of a state configured to transmit to at least one checking device integrated within each of the units an exclusivity signal relating to the exclusivity of the state;
   each of said redundant units, in the active state, being configured to transmit to said exclusive communication device an identity signal, the identity signal being specific to and identified with the respective said unit transmitting the signal;
   said exclusive communication device being configured to receive at least one of the identity signals originating from said redundant units;
   said exclusive communication device being configured to produce the exclusivity signal from at least one of the identity signals; and
   said checking device being configured to determine the exclusivity of the state of said unit from a reading of the exclusivity signal and for confirming the exclusivity of the state.

12. The checking device according to claim 11, wherein each of said redundant units is capable of producing the identity signal.

13. The checking device according to claim 11, wherein said exclusive communication device is free of electromechanical switches.

14. The checking device according to claim 11, wherein said exclusive communication device is capable of transmitting free of alteration at most one of the identity signals originating from said redundant units during a production of the exclusivity signal.

15. The checking device according to claim 11, wherein each of said checking devices is capable of constructing from said exclusivity signal a signature making it possible to verify the exclusivity of the state of the respective said unit.

16. The checking device according to claim 11, wherein each of said units comprises a signature device capable of performing a production and a transmission of said identity signal.

17. The checking device according to claim 11, wherein said signature device is capable of producing a sequence of binary data as an identity signal specific to the respective said unit.

18. The checking device according to claim 11, wherein said signature device is capable of producing said identity signal cyclically.

19. The checking device according to claim 11, wherein said exclusive communication device is configured to mutually mix and scramble one identity signal with at least one other identity signal originating from another unit whenever at least two units are simultaneously active.

20. The checking device according to claim 11, wherein said exclusive communication device is configured to generate the exclusivity signal from a simple logic function.

* * * * *